United States Patent [19]

Wentzloff et al.

[11] Patent Number: 5,104,087
[45] Date of Patent: Apr. 14, 1992

[54] NOTE/MEMO BOARD FOR COMPUTERS AND LIKE INFORMATION DEVICES

[76] Inventors: Deborah L. Wentzloff; Carey A. Wentzloff, both of 1523 S. Griffin St., Grand Haven, Mich. 49417

[21] Appl. No.: 654,318

[22] Filed: Feb. 12, 1991

[51] Int. Cl.⁵ .............................................. B41J 11/02
[52] U.S. Cl. ................................ 248/442.2; D19/52; 248/450; 248/918; 434/365
[58] Field of Search ............... 248/442.2, 450, 205.1, 248/917, 918; D19/52; 434/365, 408; 40/124, 622; 400/718

[56] References Cited

U.S. PATENT DOCUMENTS

| | | |
|---|---|---|
| D. 26,758 | 3/1897 | Burchell . |
| D. 166,040 | 2/1952 | La Plante . |
| D. 194,975 | 4/1963 | Bren . |
| D. 213,625 | 3/1969 | Jensen . |
| 1,211,833 | 1/1917 | Ertner .................. 248/442.2 |
| 2,574,575 | 11/1951 | MacIntyre ............. 400/718 |
| 3,329,771 | 7/1967 | Rose . |
| 3,538,976 | 11/1970 | Gilbert . |
| 3,541,256 | 11/1970 | Anders . |
| 3,542,365 | 11/1970 | Gantz . |
| 3,585,747 | 6/1971 | Erickson . |
| 3,605,308 | 9/1971 | Novak et al. . |
| 3,940,136 | 2/1976 | Runte . |
| 4,243,335 | 1/1981 | Singley ................. 400/718 |
| 4,373,570 | 2/1983 | Nussdorf et al. . |
| 4,475,705 | 10/1984 | Henneberg et al. ...... 248/442.2 X |
| 4,767,093 | 8/1988 | Jones ................... 248/442.2 |
| 4,834,330 | 5/1989 | Swillinger ............. 248/205.2 |
| 4,838,720 | 6/1989 | Sakai et al. ........... 400/718 X |
| 4,849,612 | 7/1989 | Stahre ................. 400/718 X |
| 4,960,257 | 10/1990 | Waters ................. 248/442.2 |

*Primary Examiner*—Ramon O. Ramirez
*Attorney, Agent, or Firm*—Varnum, Riddering, Schmidt & Howlett

[57] ABSTRACT

This relates to a note/memo board which is particularly constructed to be associated with an information display device. The note/memo board is provided with an opening for receiving a housing of the information device and is removably secured thereto by way of fastening means which are releasable. More specifically, the housing is provided with strips of VELCRO which are engaged by other strips of VELCRO carried by a leg of an angle bracket which is adjustably secured to the rear surface of the note/memo board. The note/memo board is of a varied construction which includes a front member formed of a wide variety of materials suitable for either receiving push pins or presenting a writing surface. The display surface of the memo/note board can incorporate different surfaces such as one section for receiving push pins and the other section defining a writing surface depending upon the desired function.

21 Claims, 2 Drawing Sheets

NOTE/MEMO BOARD FOR COMPUTERS AND LIKE INFORMATION DEVICES

BACKGROUND OF THE INVENTION

1. Field of the Invention

This invention relates in general to new and useful improvements in note/memo boards and more particularly to a note/memo board which can be readily mounted on a housing of an information display device such as a computer monitor, cash register, personal computer and other information display devices.

2. Description of Related Art

Note/memo boards have found use in a wide variety of applications including use in the home, office and automobile. Such note/memo boards are known to incorporate a wide variety of surfaces including a permeable surface suitable for receiving push pins, or a surface suitable for writing on, such as a chalkboard, or a write-on/wipe off surface.

Technology has introduced the computer monitor or other information display device, such as a cash register digital display, in virtually every aspect of every day life. However, these information display devices have not eliminated the necessity of hand written notes as reminders of important tasks or important information. Evidence of this fact is easily seen in the office environment where office workers commonly attach POST-IT TM notes to their computer monitor housing. The use of dozens of notes attached to the monitor looks untidy and often results in the loss notes due to the fact that the housing is not adapted to receive such notes.

SUMMARY OF THE INVENTION

The note/memo board according to the invention provides a simple, organized solution for mounting notes immediately adjacent to an information display device such as a computer monitor or cash register display.

In accordance with this invention, there is provided a note/memo board which is particularly configurated to be received around the housing of an information display device and wherein there are provided cooperating releasable means for securing such note/memo boards to the housing of an information display device.

Most particularly, in accordance with this invention, the note/memo board comprises a panel having a display surface, the panel having an inner border and an outer border. The inner border defines an opening configurated to have received therein the housing of an information display device. In the preferred embodiment, the opening is U-shaped. The rear surface of such note/memo board has releasable fasteners or mounting brackets attached thereto which will serve to fixedly secure such note/memo board to the information display device housing.

Particularly, in accordance with this invention, it is proposed to provide the rear of the note/memo board with a plurality of angle brackets each having one leg adjustably secured to the rear surface of the note/memo board and having a second leg disposed generally parallel to the information display device housing with the second leg carrying a VELCRO strip which is cooperable with a cooperating VELCRO strip mounted on the information display device housing.

The note/memo board can be easily and removably mounted on the information display device housing by first applying VELCRO strips to the housing, then seating the note/memo board on the housing, after which the angle brackets are moved towards the housing and the VELCRO strips carried thereby interlocking with the VELCRO strips carried by the housing, after which the angle members are secured in place.

In one embodiment, the note/memo board incorporates U-shaped edge members which receive the edges of the note/memo board.

The note/memo board is preferably of a composite construction and includes a base member for support and a front member formed of a material which will permit either the receipt of push pins to mount notes or a display surface which will provide a writing surface. In addition, at least a portion of the display surface can be surrounded by a decorative textile material or fabric. Further, the panel has a decorative rear surface.

With the above and other objects in view that will hereinafter appear, the nature of the invention will be more clearly understood by reference to the following detailed description, the appended claims, and the several views illustrated in the accompanying drawings.

DESCRIPTION OF THE PREFERRED EMBODIMENT

Figure 1:
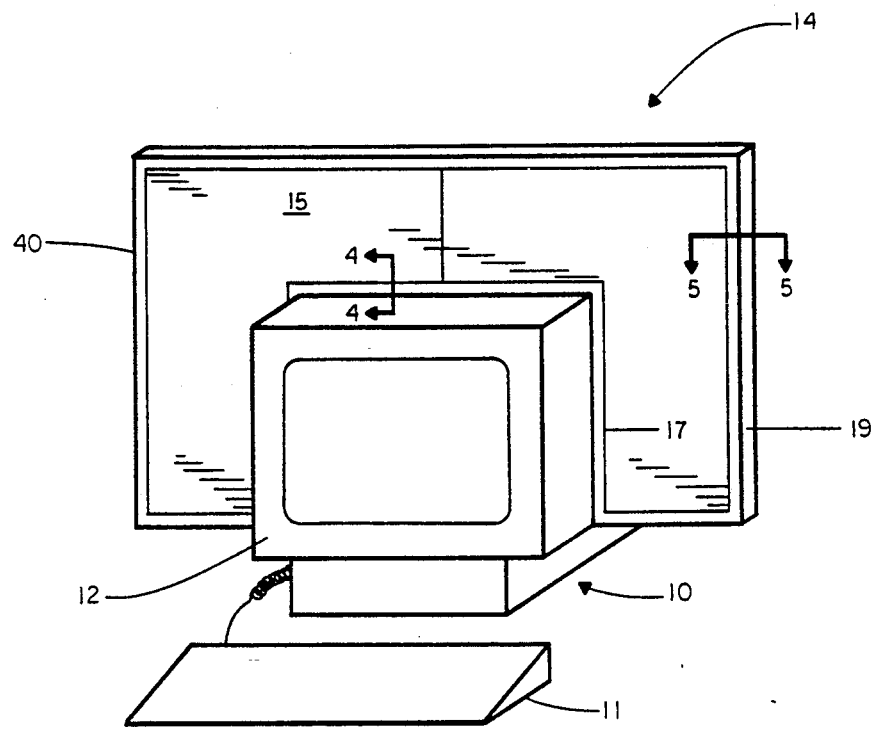
FIG. 1 is a perspective view of a computer monitor having mounted thereon a note/memo board according to the invention.

Referring now to the drawings and to FIG. 1 in particular, it will be seen that there is illustrated a monitor or information display device generally identified by the numeral 10. The monitor 10 includes a keyboard 11, a housing 12 on which, in accordance with this invention, there is removably mounted a note/memo board 14. At this point it is pointed out that while reference will be made hereinafter to the monitor 10, the monitor 10 is only one of many information display devices on which the note/memo board 14 is adapted to be mounted. For example, the note/memo board can be utilized with other video display terminals, television monitors or digital displays such as a cash register display screen or other suitable display screens.

Figure 2:
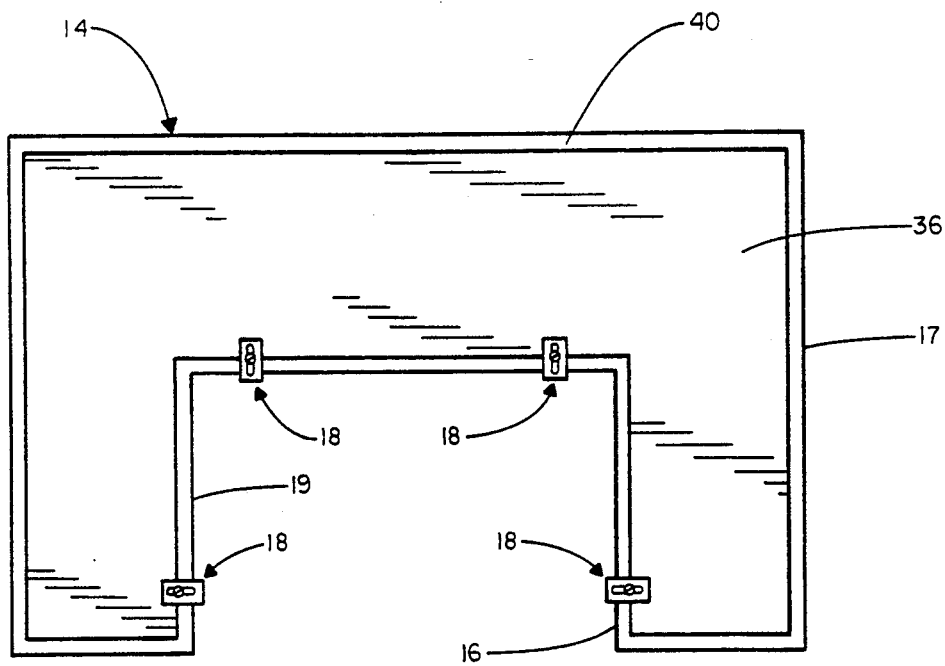
FIG. 2 is a rear elevational view of the note/memo board showing the means for mounting the note/memo board on the housing of the computer monitor.

From FIGS. 1 and 2, it will be seen that the note/memo board 14 of the preferred embodiment has a display surface 15. The board 14 is generally rectangular in outline and is provided with a central opening 16 (FIG. 2) which is complementary in shape to the perimeter shape of the housing 12. An outer border 17 extends around the outer periphery of the board 14 and an inner border 19 extends around the periphery of the central opening 16. Although the note/memo board of the preferred embodiment surrounds the monitor on three of its four sides, it is understood that the note/memo board, according to the invention, can also be constructed to surround all four sides of the housing 12 or surround less than three sides of the housing 12.

Figure 3:
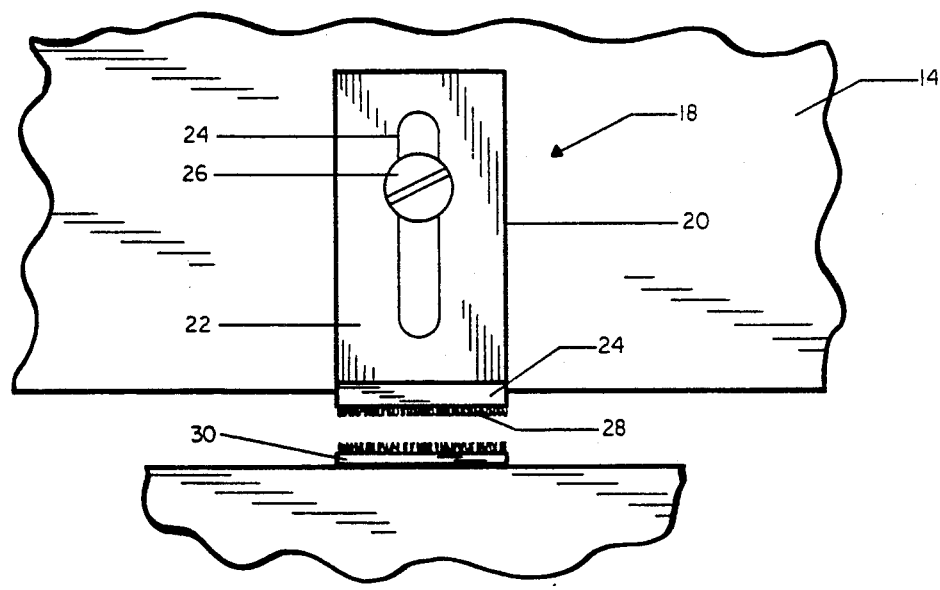
FIG. 3 is an elevational view of fastening means for mounting the note/memo board on the computer monitor.

Reference is now made to FIG. 3 wherein suitable fastening means, generally identified by the numeral 18, are utilized for the removable mounting of the note/memo board 14 to housing 12. The fastening means comprises an angle bracket 20, a screw 26 and two corresponding VELCRO layers, 28 and 30. The bracket of the preferred embodiment is L-shaped and comprises a first leg 22 and a second leg 24. The bracket 20 is adjustably mounted on the rear surface of the note/memo board 14 by the cooperation of screw 26 within a longitudinal slot 25. The diameter of the head of screw 26 is larger than the width of longitudinal opening 25 however, the width of longitudinal opening 25 is greater than the diameter of the body of screw 26. The longitudinal slot 25 allows for adjustment of the bracket 20 toward and away from the housing 12. As seen in FIG. 2, four brackets 20 are used to mount the note/memo board to the housing 12.

The second leg 24 of bracket 20 is provided with an outwardly facing VELCRO layer 28. The VELCRO strip 28 is secured to the second leg 24 by suitable means such as an adhesive (not shown). Similarly, the housing 12 is provided with a cooperating VELCRO layer 30 which is attached to the housing 12 by suitable means such as an adhesive (not shown). VELCRO layers 30 are attached to the housing 12 such that the they will be in contact with the VELCRO layers 28 of the brackets 20 when the note/memo board 14 is attached to the housing 12. The two VELCRO strips 28 and 30 will be of the male/female nature for cooperation with one another.

Figure 4:
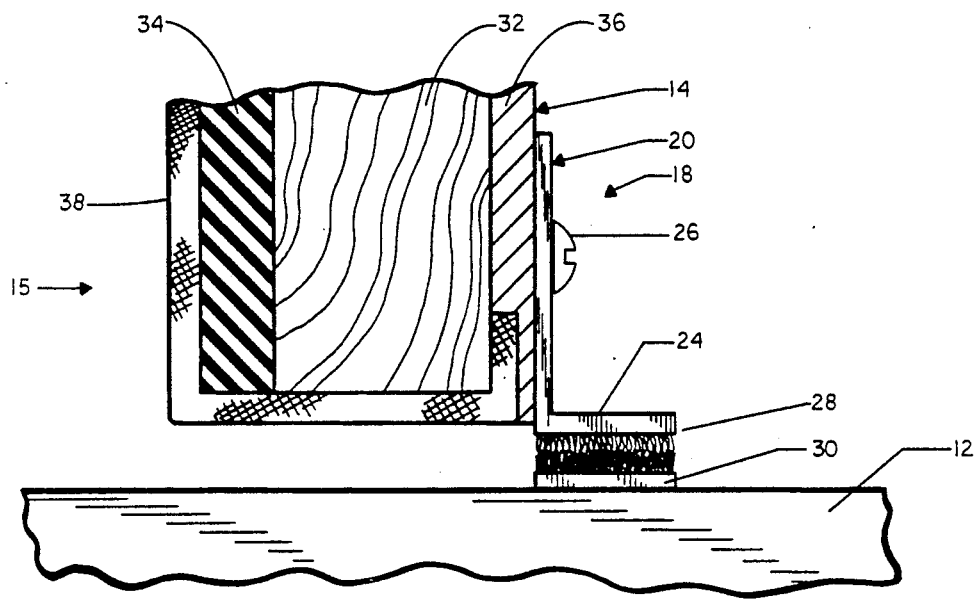
FIG. 4 is a partial sectional view taken generally along the line 4—4 of FIG. 1 and shows the manner in which the note/memo board is removably mounted on a housing of the television monitor.

FIG. 4 depicts the bracket 20 and VELCRO layers in the cooperating state. This results in fixedly attaching the note/memo board in close proximity to the housing 12. The note/memo board 14 is attached to the housing 12 by loosening screws 26 and retracting brackets 20. The note/memo board 14 is brought into close proximity with the housing such that the board 14 surrounds at least a portion of the monitor 10. Then, each bracket 20 is moved toward the VELCRO corresponding strip 30 until the VELCRO strip 28 carried thereby is interlocked, after which the associated screw 26 is tightened. The note/memo board 14 is removed by merely loosening the screws 26 and disengaging the mounting brackets 20 from the VELCRO strips 30. Longitudinal openings 25 in brackets 20 allow for incorporation of the note/memo board 14 on information display devices of varying size.

Figure 5:
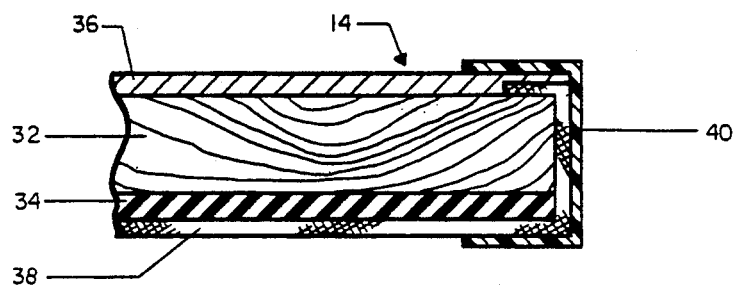
FIG. 5 is a partial sectional view taken generally along the line 5—5 of FIG. 1 and shows specifically the constructional details of the note/memo board.

Reference is now made to FIG. 5 wherein there is illustrated a typical construction of the note/memo board. The note/memo board comprises a base material 32, a pin receiving material 34, a rear cover 36 an overlying fabric 38 and an edge member 40. The base material 32 can be any suitable sturdy material such as plywood or press board. Fixedly attached to the front surface of the base material 32, in one embodiment, is a material suitable for receiving push pins such as rubber or cork, the pin receiving material 34. The pin receiving material 34 is attached to the base material 32 by suitable means such as an adhesive (not shown). The note/memo board can be covered with a textile or fabric material 38 to improve the aesthetic appearance of the board on the display surface 15. The fabric can be chosen to coordinate with other fabrics within the environment of the board 14.

As seen in FIG. 5, the fabric wraps around the display surface 15 and edges of the board 14. The end of the fabric 38 is fixedly attached to the rear surface of board 14 by suitable means such as staples, tacks or adhesive. A rear cover 36 can be attached to the rear of board 14 on top of the ends of the fabric to provide a uniform pleasing surface. In the preferred embodiment, the rear cover 36 is a thin paper or cardboard material and is fixedly attached by staples. The board can also incorporate an edge member 40 which is U-shaped and mounts on the edges of the board 14. The edge member 40 can be attached by suitable means (not shown) such as staples or adhesive. The edge member 40 can be formed of any suitable material such as plastic. The embodiments shown in FIGS. 3 and 4 do not incorporate U-shaped edge member 40.

Although the partial sectional view of the board 14 shown in FIG. 5 shows use of a pin receiving material 34 and a fabric cover 38 for the display surface, a wide variety of materials can be used on the display surface 15 of the note/memo board, depending upon the desired function of the board. These materials can include corkboard, chalkboard, or a write on/wipe off surface. The display surface 15 can present a surface comprising entirely a pin receiving material 34 or can be entirely constructed of a writing surface such as write-on/wipe off. Alternatively, any one of these materials can be incorporated on the display surface with other materials to create a note/memo board with a multiple function display surface 15.

As shown in the above disclosure, the note/memo board, according to the invention, satisfies a long felt need for users of information display devices. Through the incorporation of varying surfaces such as pin receiving material and write-on/wipe off, the operator or user of an information device can easily display numerous notes and messages in an organized and efficient manner. Users can avoid the frustration of trying to tape notes or stick POST-IT TM notes to the housing of an information display device.

The note/memo board, according to the invention, is suitable for use on a wide variety of information display devices. In addition, the use of adjustable fastening means allows for the incorporation of a single note/memo board on information display devices of varying size.

While particular embodiments of the invention have been shown, it will be understood, of course, that the invention is not limited thereto since modifications can be made by those skilled in the art, particularly in light of the foregoing teachings. Reasonable variation and modification are possible within the foregoing disclosure of the invention without departing from the scope of the invention.

PARTS LIST 10 monitor (generally)
11 keyboard
12 housing of monitor
14 note/memo board
15 display surface
16 central opening of note/memo board
17 outer border
18 fastening means
19 inner border
20 angle bracket
22 first leg of bracket
24 second leg of bracket 25 longitudinal opening in bracket
26 screw or bracket
28 VELCRO layer for second leg 24
30 VELCRO layer for housing
32 base material of board
34 pin receiving material of board
36 rear cover
38 fabric
40 edge member The embodiments of the invention in which an exclusive property or privilege is claimed are defined as follows:

1. A note/memo board for use with an information display device, the note/memo board comprising a panel having a display surface, the panel having an outer border and an inner border spaced from the outer border by the display surface, the inner border defining an opening for receiving an information device housing, and at least one mounting bracket carried by the panel for mounting an information display device housing within the opening.

2. A note/memo board according to claim 1 wherein said openings opens through an edge of said outer border.

3. A note/memo board according to claim 1 wherein said opening is U-shaped.

4. A note/memo board according to claim 1 wherein said at least one mounting bracket is in the form of a releasable fastener.

5. A note/memo board according to claim 1 wherein said at least one mounting bracket is in the form of a releasable fastener including cooperating VELCRO strips.

6. A note/memo board according to claim 1 wherein the borders are defined by U-shaped edge members receiving therein edges of said panel.

7. A note/memo board according to claim 1 wherein said at least one mounting bracket includes at least one angle bracket secured to a surface of the panel.

8. A note/memo board according to claim 7 wherein at least one releasable fastener is carried by the at least one angle bracket.

9. A note/memo board according to claim 7 wherein at least one releasable fastener with VELCRO strips is carried by the at least one angle bracket.

10. A note/memo board according to claim 7 wherein said at least one angle bracket has an adjustable connection to the panel.

11. A note/memo board according to claim 10 wherein at least one releasable fastener is carried by the at least one angle bracket.

12. A note/memo board according to claim 10 wherein at least one releasable fastener including VELCRO strips is carried by the at least one angle bracket.

13. A note/memo board according to claim 1 wherein the panel is of a composite construction and includes a base member and a front member.

14. A note/memo board according to claim 13 wherein a writing surface is mounted on at least a portion of the display surface.

15. A note/memo board according to claim 13 wherein the front member incorporates a material suitable for receiving push pins.

16. A note/memo board according to claim 13 wherein at least a portion of the display surface is covered with a fabric.

17. A note/memo board according to claim 13 wherein the panel has a decorative rear surface.

18. A note/memo board according to claim 13 wherein the display surface selectively incorporates a permeable material for receiving pins and a material presenting a writing surface.

19. A note/memo board for use with an information display device, the note/memo board comprising a panel with a display surface, an opening for receiving an information display device housing, and a releasable mounting bracket adjustably mounted to the panel for mounting an information display device housing within the opening.

20. A note/memo board according to claim 19 wherein the note/memo board is releasably attached to the information display/device housing by a first releasable fastening VELCRO strip mounted to the housing and a cooperating second releasable fastening VELCRO strip attached to the bracket.

21. In combination with a computer terminal having a housing, a note/memo board for mounting notes, memos and the like comprising a display panel, said panel having an outer border defining the outer periphery of the panel, an inner border defining an opening for receiving a housing of the video display terminal, said inner border spaced from said outer border by said display surface, and mounting brackets mounted to the panel for attaching said note/memo board to said housing with the opening in the noteboard at least partially surrounding the housing.

* * * * *